United States Patent [19]

Hegemann

[11] 4,156,504
[45] May 29, 1979

[54] TRAP MEANS FOR CENTER PIVOT IRRIGATION SYSTEM

[75] Inventor: Kenneth J. Hegemann, Ewa Beach, Hi.

[73] Assignee: Rainmatic International, Ltd., Honolulu, Hi.

[21] Appl. No.: 778,070

[22] Filed: Mar. 16, 1977

[51] Int. Cl.² ............................................. B05B 3/12
[52] U.S. Cl. ................................... 239/110; 239/119; 239/177
[58] Field of Search ............... 239/110, 119, 177, 212; 137/171, 344

[56] References Cited

U.S. PATENT DOCUMENTS

| | | | |
|---|---|---|---|
| 2,728,605 | 12/1955 | Scott | 239/212 X |
| 3,750,954 | 8/1973 | Williams | 239/212 X |
| 3,902,668 | 9/1975 | Daugherty et al. | 239/177 |

Primary Examiner—Robert W. Saifer
Attorney, Agent, or Firm—Merriam, Marshall & Bicknell

[57] ABSTRACT

Improved apparatus for flushing particulate matter from the pipeline of a center pivot irrigation system. The improved apparatus provides a length of downwardly extending pipe interposed in the pipeline in the immediate vicinity of or contiguous to the outermost mobile tower assembly of a plurality of such assemblies transporting the pipeline, permitting an operator standing on the ground to open the pipe during flushing. The downwardly extending pipe includes a restrictive opening for limiting the rate at which water is released from the pipeline during flushing.

4 Claims, 3 Drawing Figures

U.S. Patent May 29, 1979 4,156,504
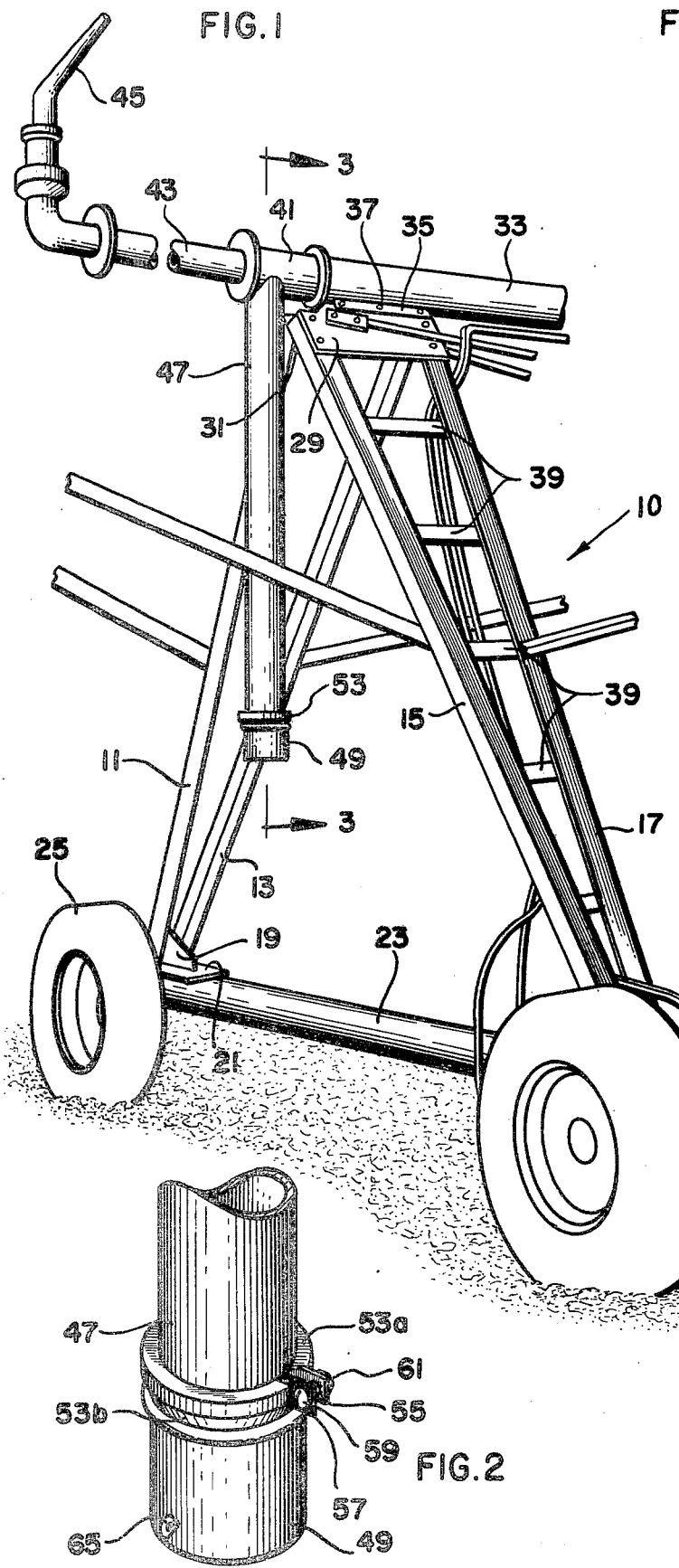
FIG. 1
FIG. 2
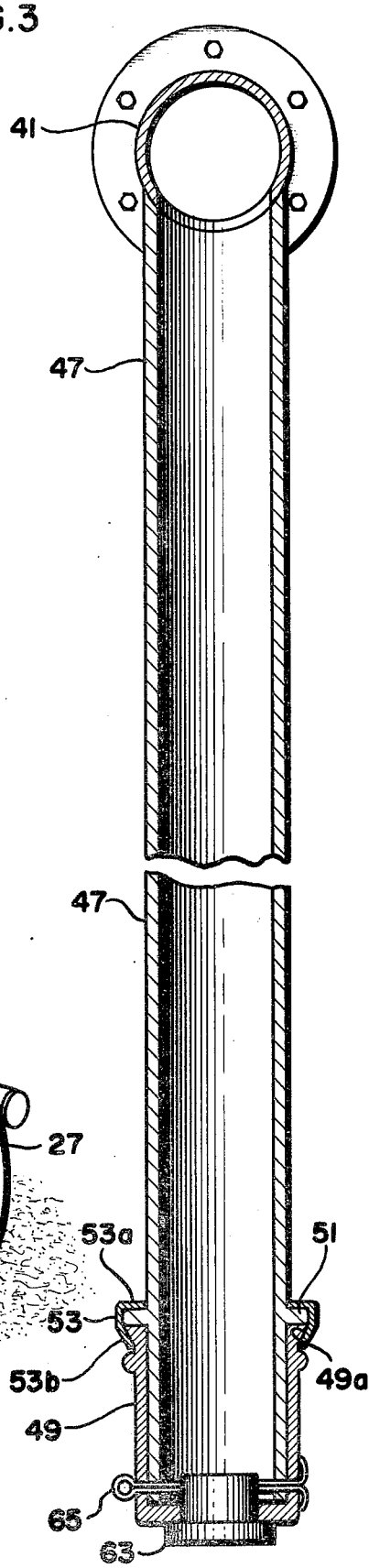
FIG. 3

TRAP MEANS FOR CENTER PIVOT IRRIGATION SYSTEM

BACKGROUND OF THE INVENTION

The present invention relates generally to improved apparatus for a center pivot irrigation system and more particularly to improved apparatus for flushing particulate matter from the system pipeline.

Center pivot irrigation systems and equipment, such as that described in my copending application Ser. No. 778,069 filed Mar. 16, 1977, and now abandoned, generally comprises a plurality of water sprinklers mounted on a series of coupled pipe sections which, in turn, are transported on mobile tower assemblies. The pipeline, in many instances, extends over one-half mile in length, and accordingly, when the pipeline is rotated about the center pivot point on the mobile tower assemblies, the system is capable of irrigating fields approximately one mile or less in diameter. A source of water is located at the center of the field, and the water is pumped into and along the length of the connected pipe sections. As the mobile tower assemblies with the pipes supported thereon rotate, water is sprayed onto the field through sprinklers which are spaced along the length of the connected pipe sections.

Center pivot irrigation systems, as is the case with most irrigation systems, are generally utilized for irrigating arid and semi-arid fields. Water obtained from wells in such areas, however, commonly contain significant amounts of particulate matter such as sand or gravel. Over the length of the pipeline, which as previously stated, may extend for more than one-half mile, the heavier particulate matter tends to precipitate from suspension in the water and settles in the pipeline. If it is allowed to accumulate, the particulate matter reduces the water delivery capacity of the system and, in an extreme case, may completely block water flow in the pipeline. This, of course, reduces the efficiency of the irrigation system and increases costs because the system must be operational for longer periods of time to deliver the requisite amount of water to the field. Accordingly, the particulate matter should be flushed periodically from the pipeline.

One apparatus heretofore provided to flush particulate matter from the pipeline of such a system comprises a short, downwardly extending drain pipe located at the outermost end of the pipeline. In such irrigation systems, the pipeline generally extends outwardly from the center pivot point beyond the outermost mobile tower assembly. A high-powered jet nozzle or gun is located at the end of the outermost pipe section for the purpose of extending the coverage of the irrigation system. By opening the downwardly extending pipe at the end of the pipeline, the particulate matter is flushed from the pipeline by the water pumped through the system. Because the drain pipe has substantially the same water carrying capabilities of the pipeline, the water moves through the pipeline faster during flushing than when the water is released under pressure through the spray nozzles. Consequently, the sand is washed along the pipeline and flushed out of the system through the drain pipe.

Several disadvantages are inherent, however, in the foregoing system for flushing the pipeline. First, the pipeline is commonly supported about ten feet above the ground by the mobile tower assemblies. Therefore, to open the drain pipe when the system is flushed, the operator, unless he is unusually tall, must carry a ladder or other means to the site in order to reach the drain pipe and open it. Of course, this involves walking through crops with a bulky ladder or the like and may result in harm to the crop. If, on the other hand, the drain pipe is lengthened so that the operator can reach the pipe and open it while standing on the ground, taller crops such as corn may be damaged by the downwardly extending pipe when the system is operational and the pipeline is transported about the center pivot point. Considering the circumference of the circular path traced by the drain pipe at the outermost end of a one-half mile pipeline, crop loss may be significant.

SUMMARY OF THE INVENTION

In accordance with the principles of the present invention, apparatus is hereinafter disclosed which obviates the problems previously encountered in removing particulate matter from the pipeline of an irrigation system. In particular, the improvement comprises downwardly extending pipe means coupled to the pipeline in the immediate vicinity of the mobile tower assembly outermost from the center pivot point so that the pipe means is transported substantially along the path followed by the outermost tower assembly. Since the tower assembly necessarily establishes and follows a path through the crops, no additional crops are damaged by positioning the downwardly extending drain pipe means contiguous with the tower assembly. This advantageously permits a longer length of downwardly extending pipe to be used with the result that a person standing on the ground can open the drain pipe without the use of a ladder.

The pipe means is adapted to collect particulate matter washed along in the pipeline by the water during normal irrigating operations and is selectively openable to release the particulate matter collected therein during irrigation as well as the water and particulate matter washed from the pipeline by the water during the flushing operation. The pipe means includes a removable cap means at its bottom end to close the downwardly extending pipe means during normal irrigating operations. Further, the cap means has an aperture therein which is normally closed by plug means which may be removed during the flushing operation. When the plug means is removed, the rate at which the water flushing the pipeline escapes through the aperture is less than the rate at which water is pumped into the pipeline. Accordingly, some of the water is forced into the upwardly inclined outermost end section of the pipeline beyond the downwardly extending pipe means with the resulting advantage that the water thereby accumulated in the outermost pipeline section will back-flush any particulate matter that has not previously been collected by the pipe means out of the pipeline through the pipe means.

BRIEF DESCRIPTION OF THE DRAWINGS

The features of this invention which are believed to be novel are set forth with particularity in the appended claims. The invention together with its further objects and advantages thereof, may be best understood, however, by reference to the following description taken in conjunction with the accompanying drawings, in which like reference numerals identify like elements in the several figures and in which:

FIG. 1 is a fragmentary perspective view of the outermost tower assembly of a center pivot irrigation system showing the location of the downwardly extending pipe means with respect to the tower assembly;

FIG. 2 is a fragmentary perspective view of the bottom end of the downwardly extending pipe means in greater detail; and FIG. 3 is a sectional view of the downwardly extending pipe means taken along lines 3—3 in FIG. 1.

DETAILED DESCRIPTION

Although the improved apparatus of the present invention may be advantageously used in conjunction with the center pivot irrigation system described in my copending U.S. patent application, Ser. No. 778,069, filed Mar. 16, 1977, it should be understood that the improved apparatus of the present invention is not limited to use with the particular system described therein, but may be adapted for use with other center pivot irrigation systems as well.

Referring now to FIG. 1, the improved apparatus of the present invention is hereinafter described. The outermost tower assembly, identified generally at 10 in FIG. 1, comprises front and rear pairs of angle iron leg members 11, 13, 15, 17. The bottom ends of leg members 11 and 13 angle toward each other and are fastened to a gusset plate 19 on opposite sides thereof. The gusset plate 19, in turn, is welded to a horizontal mounting plate 21 affixed to the top surface of a horizontally disposed tubular member 23. The other pair of leg members 15 and 17 also angle together at their bottom ends and are similarly mounted on and attached to the tubular member 23. A pair of wheels 25 and 27 are mounted to the tower assembly at opposite ends of the tubular member 23 to support and transport the tower assembly 10 thereon around the center pivot point. A wheel drive mechanism (not shown) is provided to drive the wheels 25 and 27.

Leg members 15 and 17 flare apart and are connected at their respective top ends to a mounting plate 29, while leg members 11 and 13 similarly flare apart at their respective top ends and are connected to a second mounting plate 31. As shown in FIG. 1, the leg member pairs slant to substantially meet at their respective mounting plates 29 and 31 to support a pipe section 33. In particular, the outermost end of the pipe section 33 is secured to the mounting plates 29 and 31 as illustrated by a strip 35 welded to the pipe section 33 and fastened to the plates 29 and 31 by a plurality of fastener means 37.

Leg members 15 and 17 are also connected together along their length by space cross members 39 which are adapted to enable the operator to climb the tower assembly.

A flanged T coupling member 41 is coupled to a flange on the outer end of the pipeline section 33 in the vicinity of the tower 10 to axially couple an end pipe section 43 to the pipeline 33. The end pipe section 43 extends outwardly from the outermost tower assembly 10 and terminates at an end sprinkler jet or gun 45.

Apparatus for collecting particulate matter washed through the pipeline 33 and for passing water in the pipeline 33 from the system during flushing comprises a pipe section 47 extending downwardly from the T coupling member 41 to within easy reach of a person standing on the ground. Moreover, the pipe section 47 is located in the vicinity of the outermost tower assembly 10, and in fact, may be contiguous thereto. The downwardly extending pipe section 47 is adapted to collect a particulate matter such as sand or gravel washed along the bottom of the pipe section 33 during normal irrigating operations and to release the collected particulate matter and the water and other particulate matter flushed from the pipeline 33 by the water during the flushing operation. Because the pipe section 47 is immediately adjacent to the outermost tower assembly 10, its path, as the pipeline 33 is transported about the center pivot point, is substantially coincident with the path established and followed by the wheels 25 and 27 of the tower assembly 10. Accordingly, the downwardly extending pipe section 47 will not cause additional crop damage.

A cap 49 mounted on the bottom end of the pipe section 47 closes the pipe section 47 during irrigating operations. Further details of the construction and mounting of the downwardly extending pipe section 47 and the cap 49 may be seen by reference now also to FIGS. 2 and 3. In particular, the tubular pipe section 47 opens at its upper end to the T coupling member 41 while the bottom end extends downwardly toward the ground. The cap 49 slides onto and fits over the bottom end thereof. When installed, the upper edge or rim of the cap 49 abuts an integral outwardly extending rib 51 on the pipe section 47. A slanted integral flange portion 49a is provided at the top rim of the cap 49 to abut the rim 51.

A locking ring member 53 having an upper flange 53a for contacting the top surface of rib 51 and a slanted bottom flange 53b for contacting the bottom surface of cap flange 49a is adapted to hold the cap flange 49a against the rib 51 and thereby secure the cap 49 to the bottom of the pipe section 47. The locking ring 53 is split at one point along its periphery to allow the ring 53 to expand for installation over the flange 49a and rib 51. A pair of flanges 55 and 57 on the opposing ends of the ring 53 at the slit include apertures through which a bolt 59 passes to engage a nut 61 to tighten the locking ring 53. This permits the quick and simple removal of the cap 49 from the pipe section 47 when the pipeline 33 is to be flushed.

In accordance with another aspect of the present invention, an aperture is provided in the bottom end of the cap 49, and a plug 63 is adapted to fit the aperture and close it during normal operation of the irrigation system. A cotter pin 65 passes through aligned apertures in opposite sides of the cap 49 and the bottom end of the pipe section 47 to engage a corresponding aperture through the top end of the plug 63 and secure the plug 63 in place. When the plug 63 is removed during flushing, the aperture in the bottom end of the cap 49 provides a discharge opening having a smaller cross sectional area than pipeline 33. Accordingly, although water is released through the pipe section 47 during flushing operations, the water escapes at a slower rate than the water is pumped into the pipeline 33. Consequently, some of the water is forced into the end pipe section 43 until the water source is shut off. The end pipe section 43 is slightly inclined and is higher at its outer end than at the end coupled to coupling member 41, and thus, end pipe section 43 back-flushes any particulate matter in the end pipe section 43 into the downwardly extending pipe section 47 and out through the aperture. Accordingly, the particulate matter can be flushed from the entire length of the pipeline 33.

Accordingly, improved apparatus for collecting and flushing particulate matter from a center pivot irrigation system pipeline has been disclosed. The improved apparatus advantageously allows the operator to stand on the ground to remove the cap from the end of the drain pipe during flushing operations without causing additional crop damage when the apparatus including the drain pipe is transported with the system across the field. Moreover, if a shorter drain pipe is utilized, the cross members attached to and spaced along the leg members of the tower assembly permit the operator to climb the tower assembly for access to the downwardly extending drain pipe and the pipeline.

While a particular embodiment of the present invention has been shown and described, it will be obvious to those skilled in the art that various changes and modifications may be made without departing from the invention in its broader aspects. Accordingly, the aim in the appended claims is to cover all such changes and modifications as may fall within the true spirit and scope of the invention.

What is claimed is:

1. In a center pivot irrigation system comprising a pipeline extending radially from a center pivot point to distribute water from a water source at the center pivot point to spray nozzles spaced along the length of the pipeline and further comprising a plurality of mobile tower assemblies for supportably transporting the pipeline about the center pivot point, each of the towers establishing and following a corresponding fixed path about the center pivot point, the improvement comprising:

substantially downwardly extending pipe means coupled to the pipeline immediately adjacent the tower assembly which is outermost from the center pivot point, the pipe means being transported along a path which is substantially coincident with the path followed by the outermost tower assembly, the pipe means being adapted to collect particulate matter washed along in the pipeline to the pipe means by the water and selectively release the water from the pipeline to flush the particulate matter from the pipeline through the pipe means;

removable cap means mounted to the end of the substantially downwardly extending pipe means to close off the bottom end of the pipe means;

said cap means including an end wall having an aperture therein and further including removable plug means mounted in the cap means to close the aperture, the aperture being dimensioned to restrict the rate at which water is released through the substantially downwardly extending pipe means.

2. The improvement in accordance with claim 1 wherein the outermost tower assembly includes means adapted for climbing the assembly to have access to the pipe means, the cap means being removable by an operator standing on the tower assembly climbing means.

3. The improvement in accordance with claim 1 wherein a portion of the pipeline is inclined upwardly and extends beyond said downwardly extending pipe means.

4. The improvement in accordance with claim 6 wherein water disposed in the upwardly inclined portion is back-flushed through said portion and through the pipe means when the water source is shut off.

* * * * *